LAND LEVELER

Filed June 10, 1948 10 Sheets-Sheet 1

INVENTORS.
JESSE G. LINDEMAN
CURTIS V. EDWARDS
BY
C. T. Parker & R. Johnson
ATTORNEYS

LAND LEVELER

Filed June 10, 1948 10 Sheets-Sheet 2

INVENTORS.
JESSE G. LINDEMAN
CURTIS V. EDWARDS
BY [signature]
ATTORNEYS

Dec. 15, 1953 J. G. LINDEMAN ET AL 2,662,314

LAND LEVELER

Filed June 10, 1948 10 Sheets-Sheet 3

INVENTORS.
JESSE G. LINDEMAN
CURTIS V. EDWARDS
BY
C. T. Parker & R. C. Johnson
ATTORNEYS Dec. 15, 1953 J. G. LINDEMAN ET AL 2,662,314

LAND LEVELER

Filed June 10, 1948 10 Sheets-Sheet 4

*INVENTORS.*
JESSE G. LINDEMAN
CURTIS V. EDWARDS
*BY* C. L. Parker and R. C. Johnson
ATTORNEYS Dec. 15, 1953 J. G. LINDEMAN ET AL 2,662,314

LAND LEVELER

Filed June 10, 1948 10 Sheets-Sheet 5

*INVENTORS.*
JESSE G. LINDEMAN
CURTIS V. EDWARDS

*BY*

ATTORNEYS

Dec. 15, 1953 J. G. LINDEMAN ET AL 2,662,314

LAND LEVELER

Filed June 10, 1948 10 Sheets-Sheet 6

INVENTORS
JESSE G. LINDEMAN
CURTIS V. EDWARDS
BY C. T. Parker & R. C. Johnson
ATTORNEYS

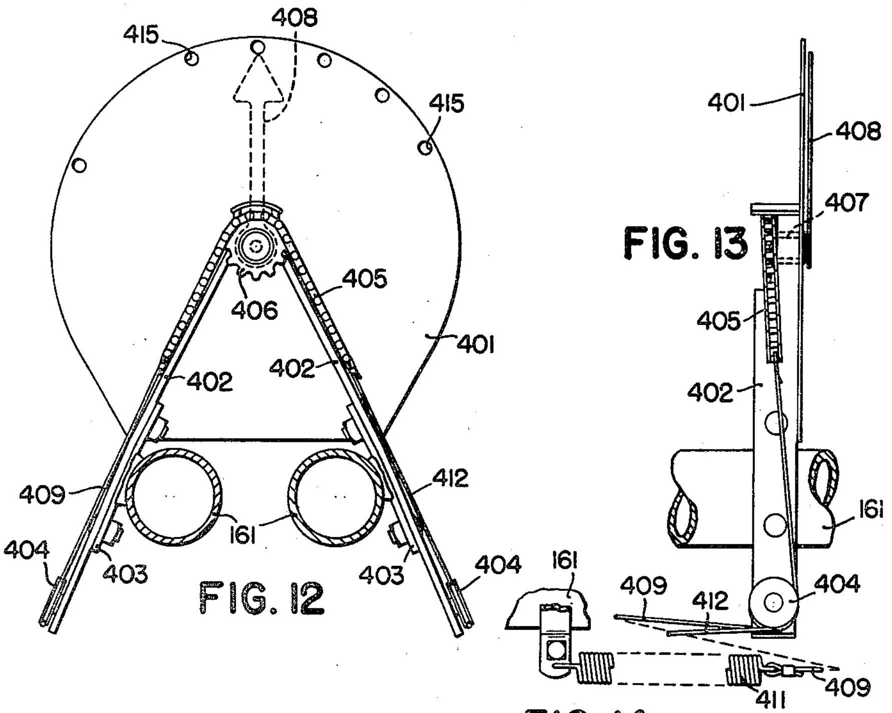
FIG. 12, FIG. 13
FIG. 14
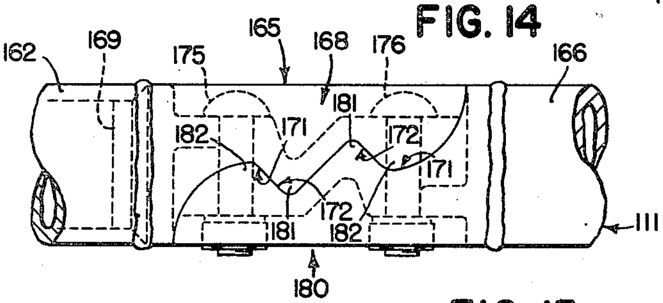
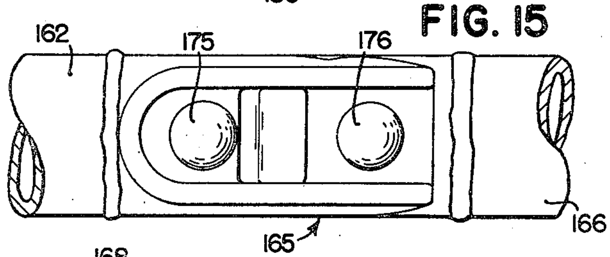
FIG. 15
FIG. 16
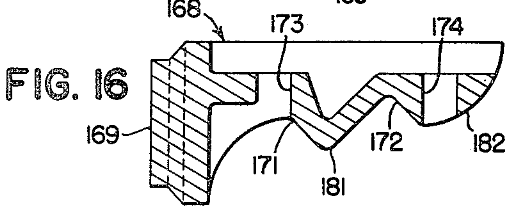
INVENTORS
JESSE G. LINDEMAN
CURTIS V. EDWARDS
BY
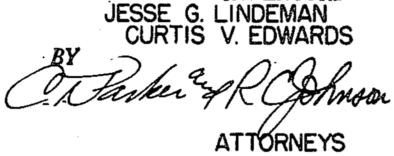
ATTORNEYS Dec. 15, 1953 J. G. LINDEMAN ET AL 2,662,314

LAND LEVELER

Filed June 10, 1948 10 Sheets-Sheet 8

INVENTORS.
JESSE G. LINDEMAN
CURTIS V. EDWARDS
BY
ATTORNEYS

INVENTORS.
JESSE G. LINDEMAN
CURTIS V. EDWARDS
BY C. T. Parker & R. Johnson
ATTORNEYS Dec. 15, 1953 J. G. LINDEMAN ET AL 2,662,314

LAND LEVELER

Filed June 10, 1948 10 Sheets-Sheet 10

INVENTORS.
JESSE G. LINDEMAN
CURTIS V. EDWARDS
BY C. T. Parker and R. C. Johnson
ATTORNEYS Patented Dec. 15, 1953 2,662,314

UNITED STATES PATENT OFFICE 2,662,314

LAND LEVELER

Jesse G. Lindeman and Curtis V. Edwards, Yakima, Wash., assignors to Deere & Company, Moline, Ill., a corporation of Illinois Application June 10, 1948, Serial No. 32,126

10 Claims. (Cl. 37—180)

The present invention relates to land levelers and particularly to large capacity levelers, particularly adapted for leveling or smoothing land, especially where irrigation is practiced.

The object and general nature of the present invention is the provision of a new and improved land leveler including frame means supported at its front and rear ends and having a transverse smoothing or leveling blade located well toward the rear of the frame means, preferably at a point forward of the rear end of the leveler a distance equal to approximately one-quarter of the length of the frame.

Another important feature of the present invention is the provision of a wheel supporting land leveler carried at its front end on a single generally centrally located wheel means and at its rear end on a pair of laterally spaced wheel units, thereby providing a three point suspension which eliminates side tilting of the scraper blade such as that which occurs when conventional four wheel levelers are used on uneven ground, the laterally spaced wheel units being disposed rearwardly of the blade and therefore situated so as to run over only leveled ground.

Another important feature of the present invention is the provision of a land leveler carried at its front end on a caster wheel unit and at its rear end on a pair of laterally spaced wheel units which are steered from the tractor that pulls the implement. Another feature of this invention is the provision of a new and improved blade construction, new and improved means for adjusting the blade and holding the same in selected positions, and new and improved means for indicating to the operator the position of the blade relative to the frame. This latter feature is of particular importance where the leveling blade is located well toward the rear of the machine.

A further and important feature of the present invention is the provision of new and improved frame construction in which the frame is made of separable parts but which when connected are securely and firmly and rigidly held in connected relation, thereby providing a sturdy rigid support for the blade, yet when necessary to dismantle the leveler, as when shipping by truck or railway, the frame may be separated into component parts of relatively short lengths which facilitate handling the machine for transport.

These and other objects and advantages of the present invention will be apparent to those skilled in the art after a consideration of the following detailed description, taken in conjunction with the accompanying drawings, in which:

Figure 12 is an enlarged detail view of the blade position indicating mechanism;

Figure 13 is a side view of the parts shown in Figure 12;

Figure 14 is an enlarged detail view of one of the breakaway connections between two separable parts of the leveler frame;

Figure 15 is a plan view of the connection shown in Figure 14;

Figure 16 is a sectional view taken through one of the mating parts of one of the breakaway connections shown in Figures 14 and 15.

Figure 1:
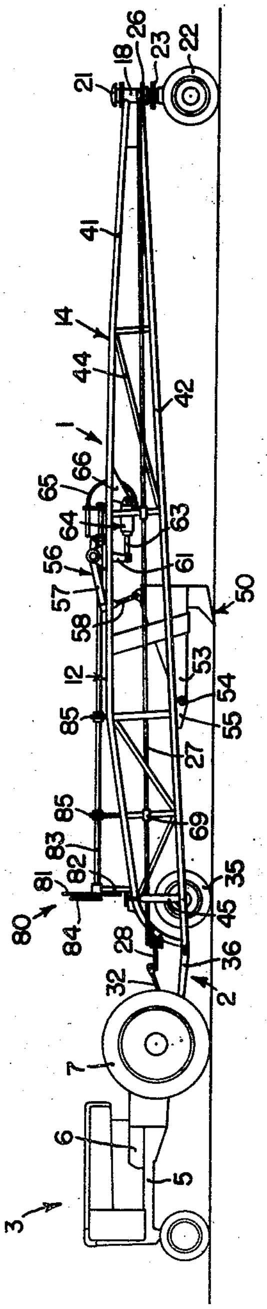
Figure 1 is a side view of a tractor-propelled land leveling outfit in which certain features of the present invention have been incorporated.
Figure 2:
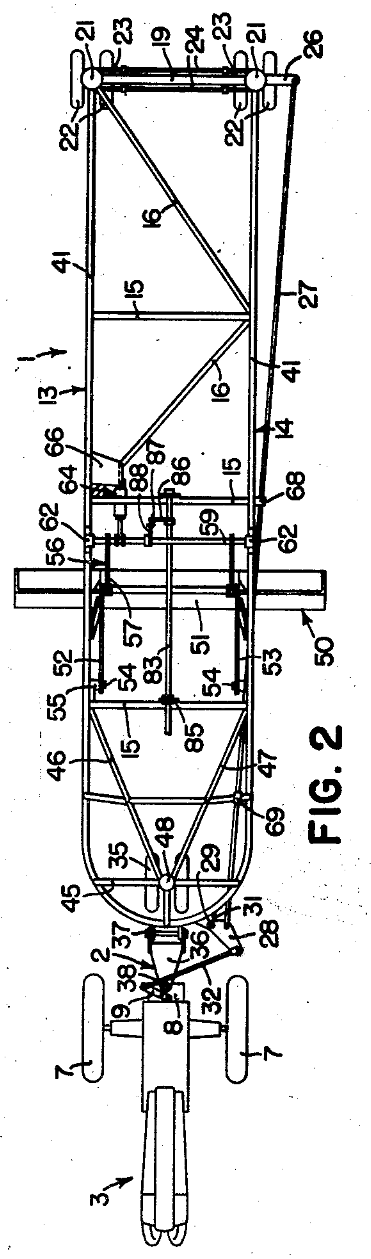
Figure 2 is a plan view of the leveling outfit shown in Figure 1.

Referring now to the drawings, particularly Figures 1 and 2, the land leveling machine of this form of the invention is indicated in its entirety by the reference numeral 1 and is connected by hitch means 2 to a tractor, indicated in its entirety by the reference numeral 3. The latter may be of any suitable construction but preferably includes a wheel supported frame 5 which carries a source of power, such as an internal combustion engine 6 which drives traction wheels 7. The tractor 3 also includes a drawbar member 8 to which turning bar 9, referred to later, is rigidly connected.

The land leveler machine 1 comprises a generally elongated frame 12 made up of a pair of longitudinally extending bars 13 and 14 which are connected together by suitable cross members 15 and diagonal braces 16 to form a rigid sturdy framework. The rear ends of the side bars 13 and 14 are connected to vertical sleeve members 18 to which a rear cross member 19 is rigidly secured. Mounted on each of the vertical sleeves 18 is a spindle 21 on the lower end of which a pair of closely spaced supporting wheels 22 are journaled. Each spindle, immediately below the associated sleeve 18, carries a sprocket over which a section of chain, as indicated at 23, is trained, the two ends of the two chains 23 being interconnected by links 24 whereby both sets of wheels 22 may be turned substantially the same amount. The left hand spindle 21 carries a steering arm 26 which is connected by a long forwardly extending link 27 to a bell crank 28 pivotally mounted at 29 on a bracket 31 carried by the front end of the frame. The crank 28 is connected by a steering link 32 to the turning arm 9 on the tractor, as best shown in Figure 2. The front end of the leveler frame 2 is supported on a caster wheel unit 35 which is disposed centrally at the front end of the frame, and the hitch member 2 comprises a rigid part 36 hingedly connected at its rear end to the front end of the frame 12 by any suitable means, such as a transverse hitch pin 37, carried in lugs or the like fixed to the leveler frame. By virtue of the hinged connection 37, the hitch member 2 can swing vertically relative to the leveler frame but is prevented from pivoting laterally. However, the front end of the hitch member 2 is pivotally connected, as at 38, to the drawbar 8 of the tractor. Therefore, when the tractor 3 is steered to one side or the other the turning bar 9 is swung in one direction or the other relative to the hitch pivot 38, thereby exerting a thrust or pull through the rod or link 32 against the crank 28. By this means, the latter is shifted generally in a fore and aft direction to exert a pull or a thrust through the long link 27, thus acting through the steering arm 26 to turn both of the rear sets of wheels 22. This materially facilitates a steering of the leveler, as when making turns or the like.

The side members 13 and 14 of the frame 12 are each made up of upper and lower bars 41 and 42 which are suitably interconnected by vertical and diagonal struts 43 and 44. At the front end of the frame 12 the latter carries an arched cross bar 45 which is reenforced by diagonal bars 46 and 47 and associated bracing. These parts form a rigid support for a sleeve 48 in which is disposed a spindle on the lower end of which the wheels 35 are journaled.

A blade unit 50 is carried by the frame 12 generally intermediate the ends thereof. The unit 50 includes a blade or bowl 51 to which are rigidly interconnected blade arms 52 and 53. The arms 52 and 53 are pivotally connected, as at 54, to brackets 55 fixed to the lower frame bar 42 at each side of the frame 12. The unit 50 is raised and lowered by means of a bell crank 56 which comprises a lifting arm 57 connected by means of a link 58 to the rear portion of the blade unit 50, a shaft 59 to which the lifting arm 57 is fixed, and a depending arm 61 fixed at its upper end to the shaft 59. The latter is mounted for rocking movement by bearings 62 carried by the upper side frame members 41 in any suitable manner. The arm 61 is connected to the piston 63 of a hydraulic ram or jack unit 64 which receives fluid under pressure through a line 65 that extends forwardly to a source of hydraulic power (not shown) on the tractor and controlled from the tractor. The rear end of the ram unit 64 is pivotally connected to a heavy bracket 66 carried by the right hand side frame unit 13.

The elongated steering link 27 is supported at two or more points on the frame 12 by means of guide sleeves or spindles 68 and 69, best shown in Figure 2.

The position of the blade unit 50 in operation is indicated in Figure 1, which position is usually one or two inches, more or less, below the horizontal plane tangent to the lower portions of the supporting wheels 22 and 35, and changes in the position of the blade, either the working position or the raising and lowering of the blade into and out of transport position, may be effected by control of the fluid directed under pressure to the ram unit 64. In order that the operator may know definitely the position of the blade 50 relative to the supporting frame 12, we have provided a dial unit 80 at the front of the frame 12. The unit 80 comprises a dial 81 supported by a frame 82 or the like carried by the frame bars 41 adjacent the front end of the frame. The frame 82 also serves as a support for the front end of a longitudinally extending shaft 83, the front end of which projects forwardly of the dial 81 and carries a swingable indicator hand 84. The rear end of the shaft 83 is supported in any suitable way, as by one or more lugs 85 on the frame 12, and is connected to be rocked when the blade 50 is raised or lowered by an arm 86 on the rear end of the shaft 83 connected by a link 87 to an arm 88 on the shaft 59, as best shown in Figure 2. Any suitable means for operating the indicating hand 84 may be provided, as desired.

Figure 3:
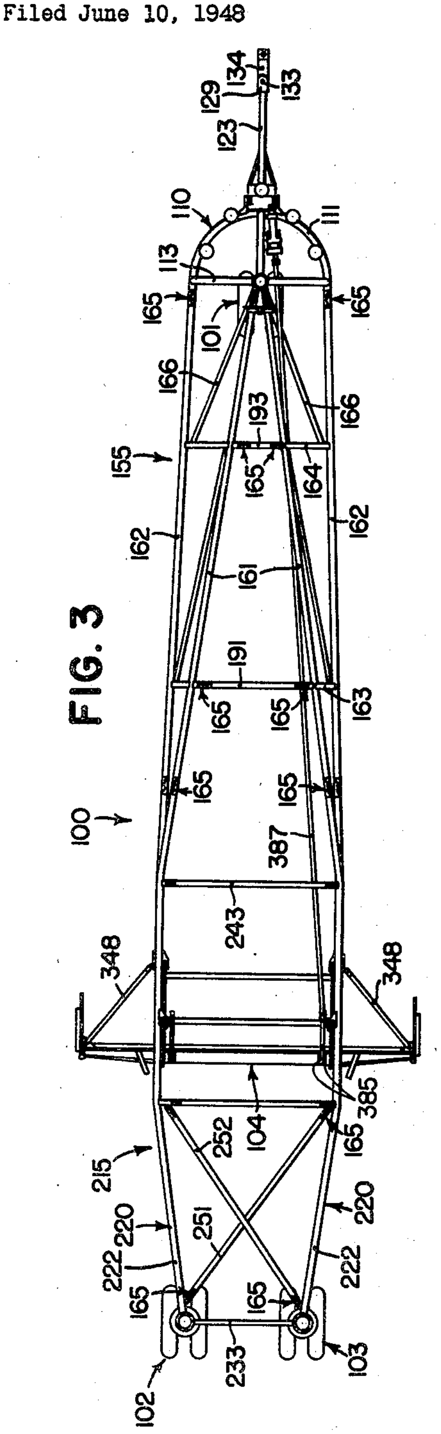
Figure 3 is a plan view of another form of the present invention.
Figure 4:
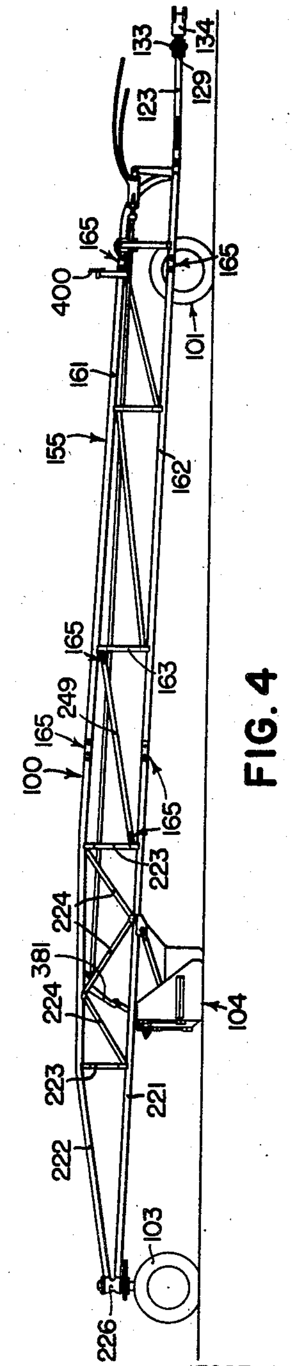
Figure 4 is a side view of the land leveler outfit shown in Figure 3.

Referring now to the form of the invention shown in Figure 3 et seq., the frame of the land leveler is indicated in its entirety by the reference numeral 100 and, as best shown in Figures 3 and 4, is carried on a forward centrally disposed wheel means 101 and a pair of laterally spaced rear wheel means 102 and 103. Situated approximately three quarters of the total length of the frame rearwardly of the front end thereof is a transversely disposed blade unit 104 movably connected with the frame 100. The frame 100 is an elongated structure that, in one form of the invention, is approximately fifty feet in length. In order, therefore, to facilitate the manufacture, assembly and dismantling of the machine for shipment and transport, we have made up the frame unit 100 in a plurality of separable sections connected together by a novel form of clamping means which, while providing a rigid sturdy construction when the sections are connected together, nevertheless provides for a ready disassembly and dismantling of the frame sections when desired. This construction is shown in Figures 14–18 and will be referred to later in detail.

Figure 5:
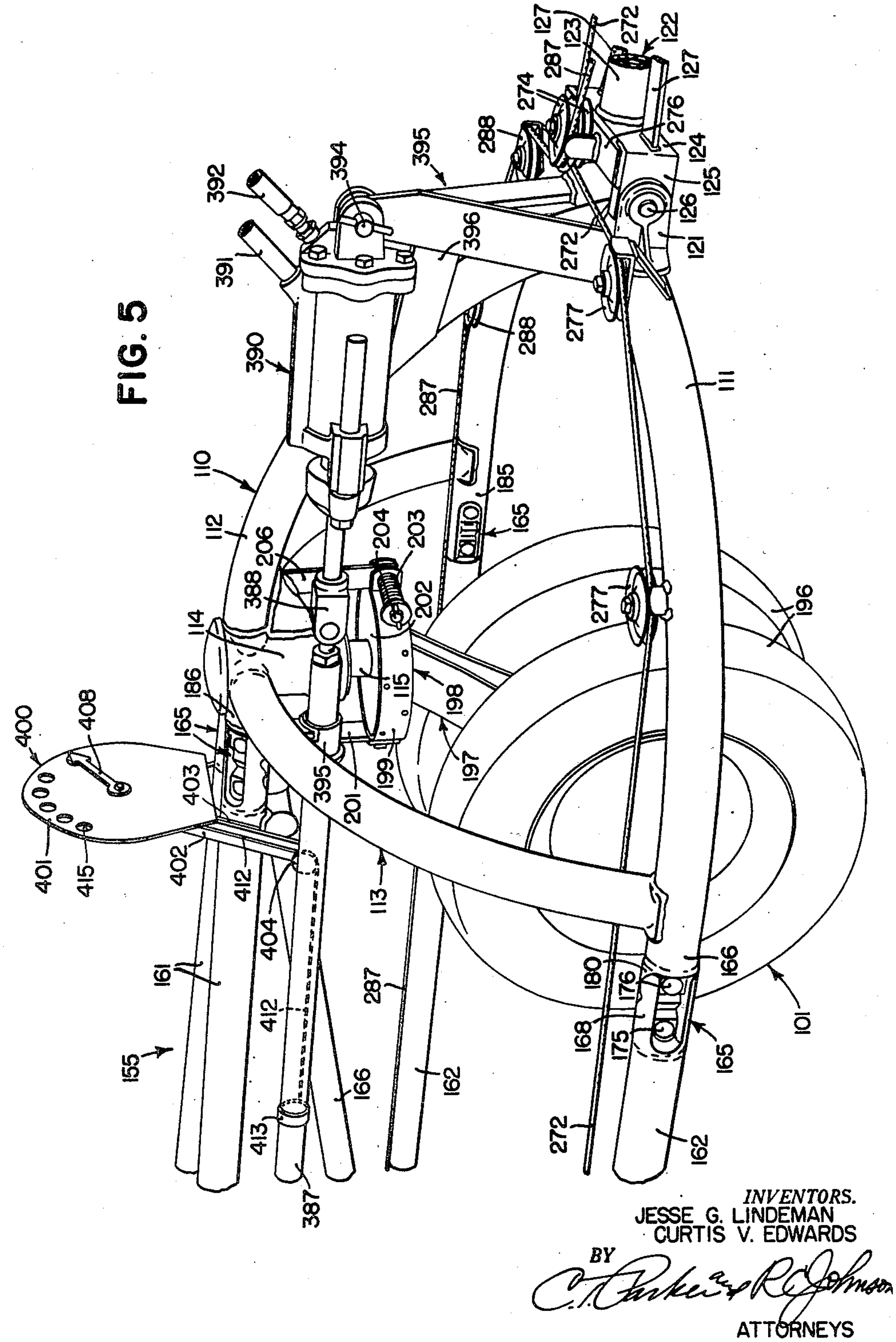
Figures 5, 6 and 7 are fragmentary perspective views, taken at an enlarged scale, showing the details of the frame construction, wheel mountings and associated parts.
Figure 9:
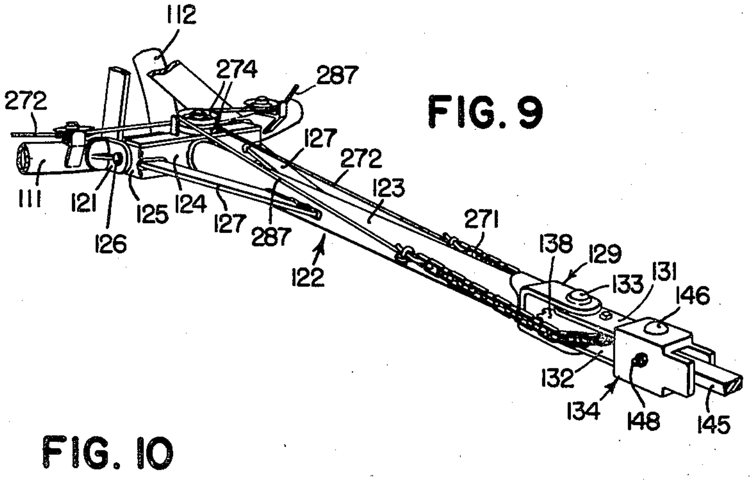
Figure 9 is a fragmentary perspective view showing the hitch connection between the front end of the frame and the propelling tractor and certain features of the actuating means and connections whereby the rear wheel units of the leveler are steered by the turning of the tractor that propels the machine.
Figure 11:
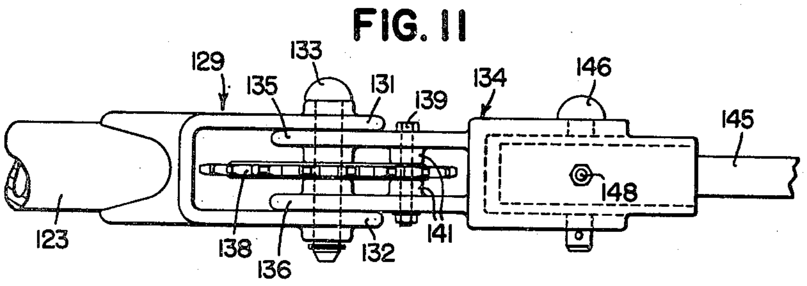
Figure 11 is a side view of the hitch details shown in Figure 10.
Figure 17:
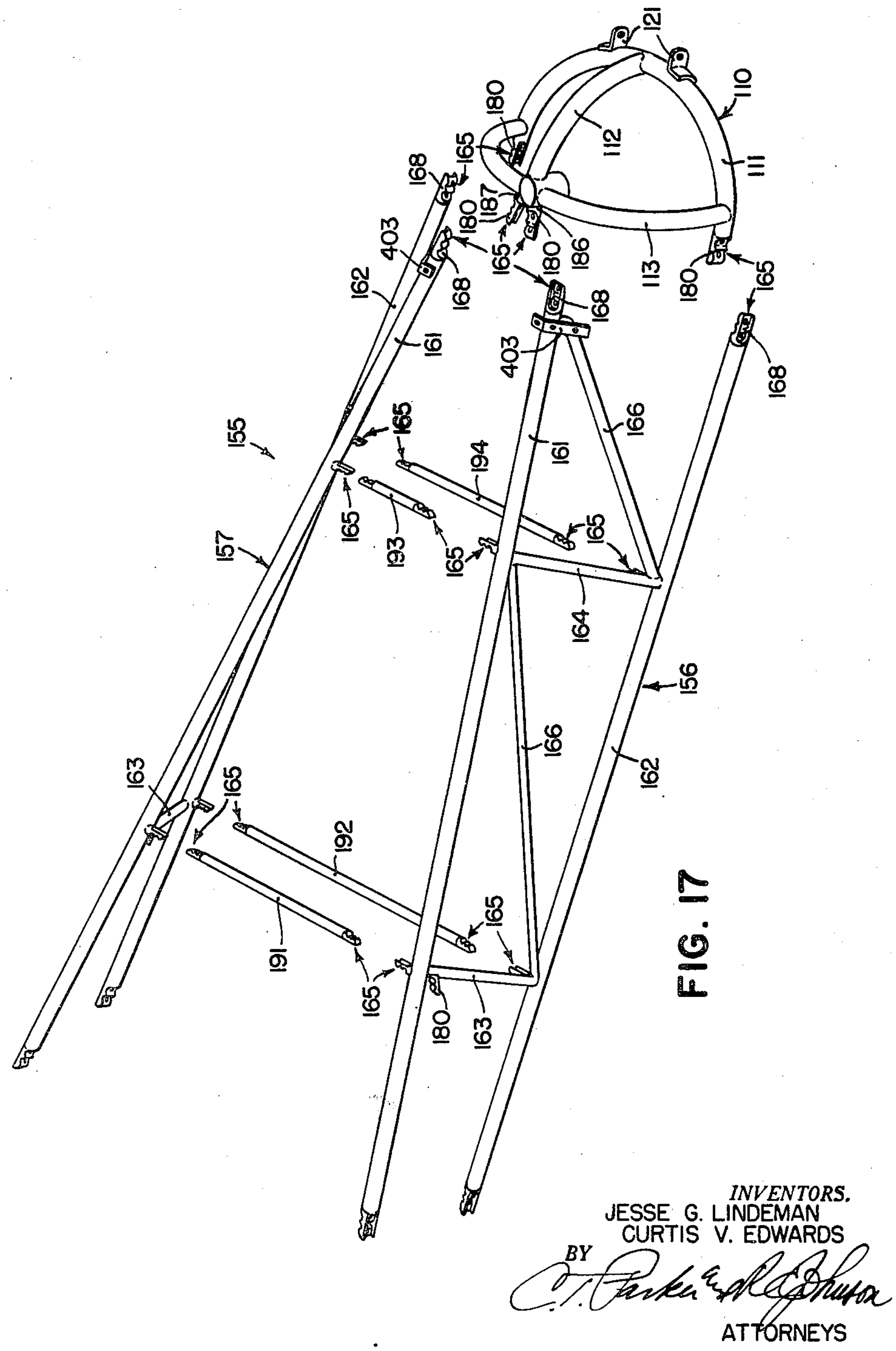
Figures 17 and 18 are fragmentary perspective views showing the frame parts disassembled.
Figure 18:
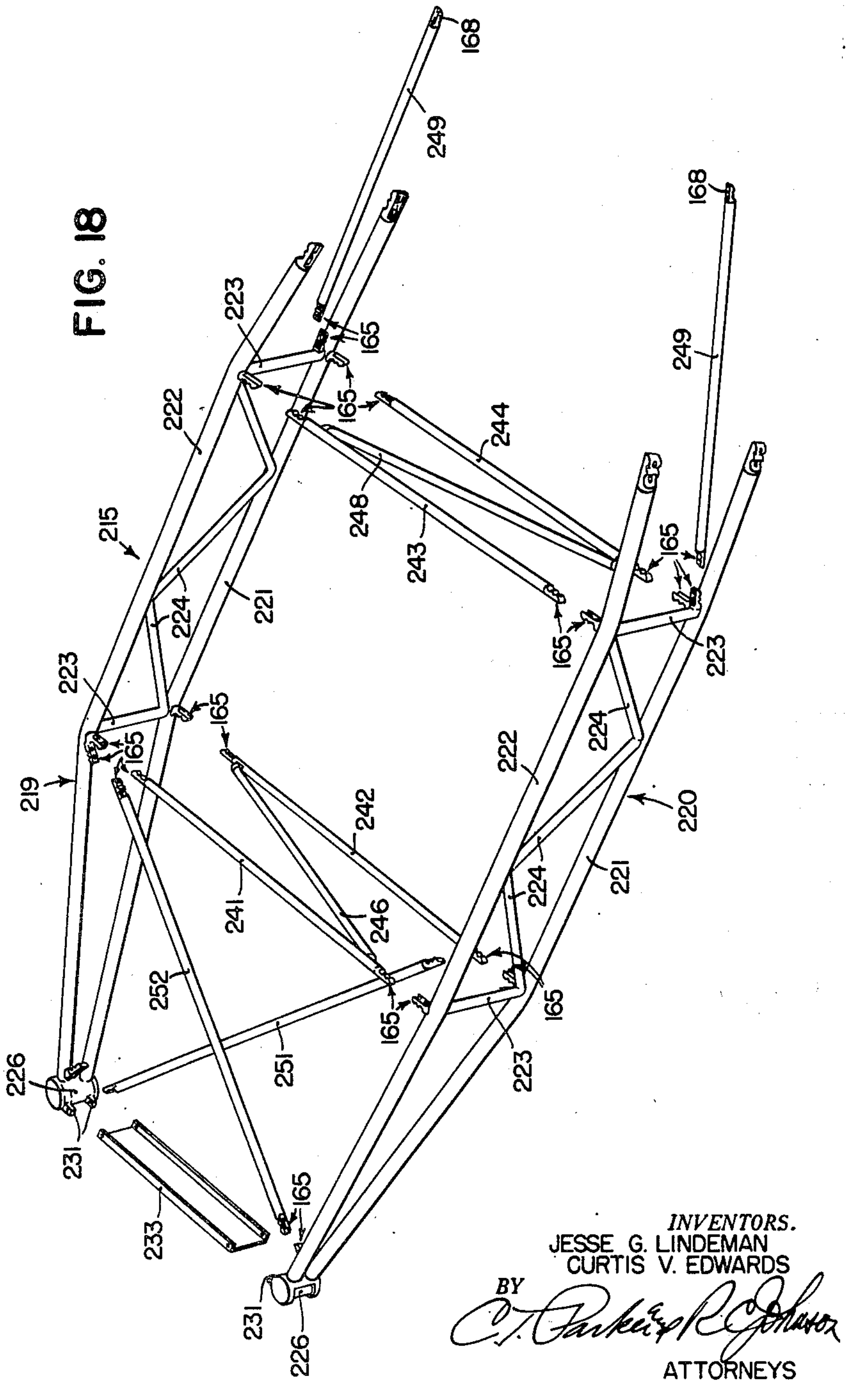

The forward or caster wheel section of the main frame 100 is indicated by the reference numeral 110 (Figures 5 and 17) and comprises three arcuate frame pipes 111, 112 and 113. The frame member 11 is disposed in a horizontal plane, and secured as by welding to the rear lugs thereof is the arcuate pipe section 113 which is disposed generally in a vertical plane. The central portion of the arcuate member 113 is preferably in the form of a vertical sleeve section 114 in which a spindle 115 is mounted for rotation about a vertical axis, and the forward portion of the sleeve 114 is secured, as by welding, to the rear portion of the third or central arcuate frame section 112. The forward end of the section 112 is secured by welding or the like to the forward or central portion of the horizontal arcuate frame member 111. A pair of laterally spaced lugs 121 are secured, as by welding, to the front side of the central portion of the arcuate frame member 111 and, as best shown in Figures 5 and 9, the two lugs 121 hingedly receive the rear end of a hitch connection in the form of a pole or tongue which is indicated in Figure 9 in its entirety by the reference numeral 122. The pole 122 is preferably in the form of a pipe member 123 to the rear end of which a transverse yoke section 124 is welded, the yoke section 124 having rearwardly directed apertured ears 125 which receive the hinge pins 126 connecting the yoke to the two lugs 121 at the forward end of the frame. The yoke 124 is braced by a pair of diagonal straps 127 welded to the pipe 123 and the laterally outer portions of the yoke 124. A forward yoke 129 is secured, as by welding, to the forward end of the pole pipe 123 and includes upper and lower sections 131 and 132 (Figure 11) which are apertured to receive a pin 133 on which a laterally swingable hitch member 134 is swingably mounted.

Figure 10:
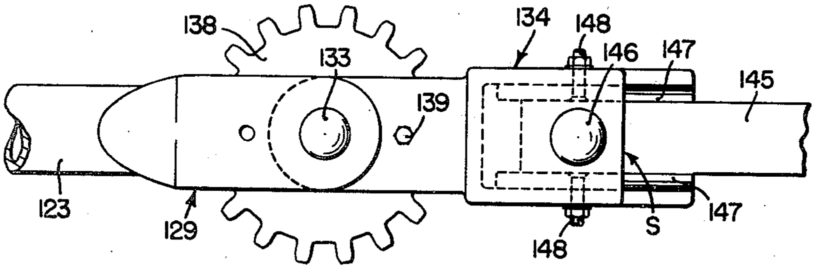
Figure 10 is an enlarged fragmentary plan view of the hitch parts at the forward end of the tongue or pull of the leveler.

The member 134 is preferably in the form of a casting having upper and lower sections 135 and 136 which are apertured to receive the pivot pin 133, and the sections 135 and 136 are spaced apart so as to receive therebetween a sprocket wheel 138. The sprocket 138 is connected to move with the laterally swingable hitch member 134 by means of a bolt 139 that extends downwardly through apertured bosses 141 carried by or formed on the member 134 and through the adjacent portions of the sprocket 138. The forward part of the laterally swingable hitch member 134 is formed as a socket which faces forwardly and receives a hitch member 145, which may be the drawbar of a tractor, or connected directly to the drawbar of a tractor, such as to the drawbar 8 of the tractor 3 shown in Figures 1 and 2. The rear end of the drawbar strap 145 is apertured to receive a hitch pin 146, and the sides of the socket, which are indicated by the reference character S in Figure 10, are provided with shims 147, fastened in place by bolts 148, whereby when the tractor is turned relative to the implement the laterally swingable hitch member 134 swings laterally on its pivotal connection 133. The rear end of the tractor drawbar 145 is received by the bolt 146 in the socket S with sufficient looseness to permit a limited amount of up and down swinging of the member 145 relative to the laterally swingable hitch member 134. When the tractor is turned laterally the member 134 is caused to swing laterally about the pivot 133, carrying with it the sprocket 138. The latter is connected to chains and other linkages with the rear wheel units 102 and 103 of the machine to steer the rear wheels, as will be explained in detail later.

The forward frame unit, which is connected to the rear portion of the caster wheel frame unit 110, is indicated in its entirety by the reference numeral 155 and comprises a right hand frame side 156 and a left hand frame side 157, which are substantially identical one with the other except that one is right hand and the other is left hand. The right hand frame side member 156 comprises an upper pipe member 161 and a lower pipe member 162 rigidly interconnected by a pair of vertical struts 163 and 164 and a diagonal brace 160, these parts being welded together or otherwise firmly and rigidly interconnected. The left hand side frame member 157 is of substantially the same construction and hence the same reference numerals have been used for corresponding members. At their forward ends each of the lower frame pipes 162 is connected to the rear end portion of the horizontal arcuate member 111 (Figure 5) by quick detachable connections which will now be described. As shown in Figure 14, a connector unit 165 is disposed between the forward end of the frame pipe member 162 and the rear end 111*a* of the horizontal arcuate frame member 111 (see Figure 5) at that side of the tractor. Preferably, each connector unit 165 includes a lug member 168 and a support section 169, which latter section is secured, as by welding, to the forward end of the right hand frame pipe 162, as best shown in Figure 14. The lug 168 is provided with a pair of outwardly facing sockets 171 and 172 and adjacent thereto a pair of openings 173 and 174. The latter openings are adapted to receive bolts 175 and 176, the heads of which are disposed non-rotatably in the openings 173 and 174. The lower or threaded ends of the bolts 175 and 176 are extended through the corresponding openings in a similarly shaped interlocking clamp member 180 which is secured, as by welding, to the right hand end part 166 of the forward frame member 111. Preferably, the two interlocking members 168 and 180 are identical, each of such members having a pair of lugs 181 and 182 which are shaped to seat in the sockets 171 and 172 of the associated connecting member, best indicated in Figure 14. As will be seen from this figure, the sockets 171 and 172 and corresponding lugs 181 and 182 are generally wedge shaped so that when the bolts 175 and 176 are tightened the two clamping parts 168 and 180 are rigidly and positively held in connected relation but without stressing the bolts in shear or relying on the bolts in any way other than in tension for holding the wedge-shaped lugs 181 and 182 in the correspondingly formed sockets 171 and 172. However, by loosening or removing the bolts 175 and 176 the two parts 167 and 180, together with the associated frame members, may readily and quickly be separated when dismantling or disassembling the frame for transport or other purposes. The present invention makes use of the above described mating clamping members 168 and 180 at a number of points in the frame as will appear from the following description, particularly in connection with Figures 17 and 18.

In a similar way the front end of the left hand frame bar 162 is connected to the end 185 of the forward frame member 111 opposite the end 166. The central portion of the vertical arched member 113 is provided with a pair of extensions 186 and 187 (Figure 17) to receive the associated connectors 165 by which the two upper frame bars 161 at each side of the machine are detachably connected to the forward or caster wheel section 110 of the frame. The two forward side frame sections 156 and 157 are interconnected by four cross members 191, 192, 193 and 194. The cross member 191 is connected by clamping connectors 165 to the rearward portions of the right and left hand upper frame pipes 161, and the lower cross brace 192 is fastened by connectors 165 to the right and left hand lower frame pipes 162, preferably adjacent the vertical struts 163. Similarly, the forward cross members 193 and 194 are fastened by connectors 165 to the upper and lower right and left hand frame pipes 161 and 162.

The front wheel unit 101 comprises a pair of closely spaced pneumatic tired wheels 196 mounted at the lower end of a spindle member 197 of which the spindle section 115 mentioned above is a part. The spindle section 115 is journaled by suitable bearing means in the sleeve 114 that forms a part of the caster wheel frame unit 110. In order to prevent undesirable lateral oscillations of the wheel unit 101 in operation, a snubbing brake 198 is provided. The brake 198 includes a brake band 199 anchored to a bracket 201 carried by the frame unit 110 rearwardly of the sleeve 114. The member 199 is in the form of an external contracting brake band, and the end portions of the latter are pressed against a drum 202 that is fixed to the spindle 115 by any suitable means. The brake band is pressed against the drum 202 by a spring 203 acting against an adjustable anchoring bolt 204 carried by a bracket 206 on the frame unit 110. The brake band 199 is adjusted to such degree as to prevent the front wheels 196 from oscillating laterally but the brake does not interfere with the turning of the wheel unit when the front end of the leveler is drawn toward one side or the other.

Figures 6, 7:
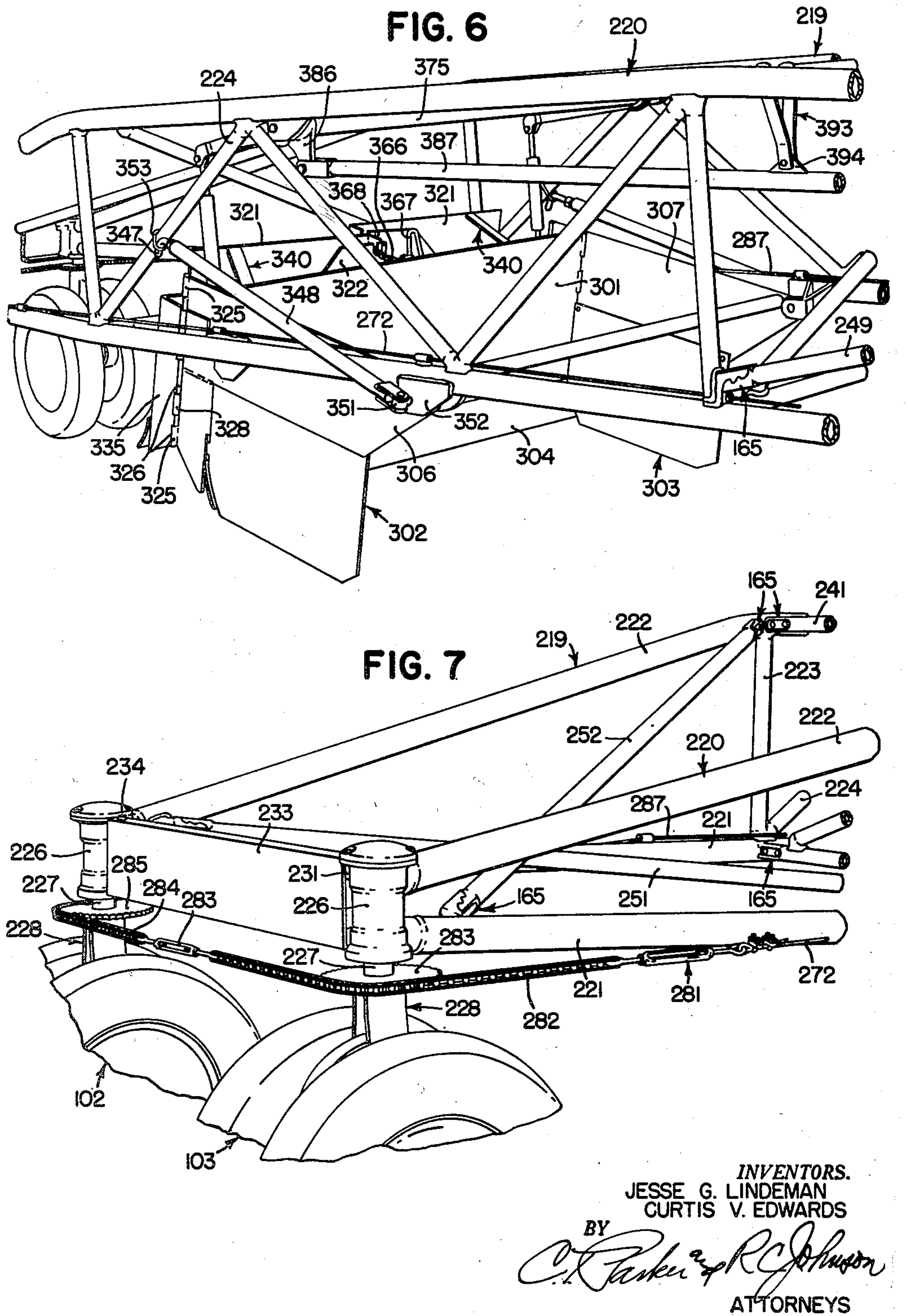

The rear frame section of the main frame 100 is indicated in its entirety by the reference numeral 215 (Figures 8 and 18), and is the section which carries the transverse blade unit 104. The rear frame section includes a left hand side frame unit 219 and a right hand side frame 220. Each side frame unit includes a lower frame pipe 221 and a upper frame pipe 222 suitably connected together by vertical struts 223 and a plurality of diagonal braces 224, the parts being preferably welded together. The rear end of the upper frame pipe 222 is bent downwardly, as best shown in Figure 7, to a point adjacent the rear end of the lower frame pipe 221. The rear ends of the two members 221 and 222 are welded to a vertical sleeve 226 in which the upper end 227 of a spindle member 228 is mounted for rotation. Each rear set of ground wheels 102 and 103 is mounted for rotation on the lower end of the associated spindle member 228. The right and left hand rear frame side sections are substantially identical, except that one is right hand and the other is left hand, and hence the same reference numerals have been used for corresponding parts. The rear ends of the upper and lower frame parts 221 and 222 at the left side of the implement are welded to the left hand spindle-receiving sleeve 226, and the left hand spindle 228 is mounted for rotation in the left hand sleeve 226. The two sleeves 226 are provided with laterally inwardly directed upper and lower lugs 231 (Figure 18), and the two sleeve sections 226 are rigidly interconnected by means of a transversely disposed channel member 233, the flanges of which are bolted, as at 234, to the lugs 231.

The two side frame sections 219 and 220 are interconnected by four detachable cross braces 241, 242, 243 and 244, each of the cross braces 241—244 having a connector 165 at its outer end by which each member is connected to the upper and lower frame pipes 221 and 222. A diagonal reenforcing brace 246 is welded to and connects the rear pair of cross members 241 and 242, and a similar diagonal member 248 connects the two forward cross bars 243 and 244. At each side of the leveler the front and rear side frames are connected by a diagonal bar 249 attachable by connectors 165 to struts 163 and 223, as best shown in Figure 4. The rear portion of the frame unit 215 is reenforced by a pair of diagonal members 251 and 252. The member 251 is connected at its rear end by a connector 165 to the left hand spindle sleeve 226 and at its forward end the diagonal member 251 is secured by a connector 165 to the lower right hand side frame pipe 221 adjacent the associated rear vertical strut 223. Similarly, the other diagonal member 252 is fastened by a connector 165 to the right hand spindle sleeve 226, the member 252 extending laterally and forwardly where it is fastened by a connector 165 to the upper side frame member 222 adjacent the upper end of the left hand rear vertical strut 223 and the adjacent rear upper cross bar 241.

The rear wheel units 102 and 103 are turned or steered in accordance with lateral swinging of the hitch pole 123 relative to the front end of the frame 100. To this end, a section of chain 271 (Figure 9) is trained around the sprocket 138 and the left end of the chain 271 is connected to a cable 272 that extends rearwardly along the pole 123 and over the lower of a pair of sheaves 274 which are mounted on a bracket 276 carried by the yoke 124, as best shown in Figure 5. From the lower sheave 274 the cable 272 extends rearwardly around the right hand side of the machine, being supported by a pair of idler shafts 277 carried by the horizontal arched member 111. Adjacent the rear end of the leveler, on the right side thereof, the cable 272 extends through a pair of guide thimbles 278 and 279 (Figure 8) and at its rear end the cable 272 is connected by an adjustable turnbuckle 281 to the right end of a section of chain 282, as shown in Figure 7. The chain 282 is trained over a sprocket 283 that is fixed to the spindle 227, and the end of the chain 282 opposite the turnbuckle 281 is connected by a turnbuckle 283 with the adjacent end of a second chain section 284 which is trained over a sprocket 285 that is fixed to the left hand spindle 228. A cable 287 (Figure 7) is connected to the forward end of the chain section 284, the cable 287 being supported along the left hand side of the machine in substantially the same way as the cable 272 is supported along the right hand side of the machine. At its forward end (Figure 5) the cable 287 is trained around a pair of idlers 288 and around the upper of the sheaves 274 from whence the cable 287 extends forwardly along the right side of the pole 123 and is connected to the end of the chain section 271 opposite the cable 272. Thus, whenever the laterally swingable hitch member 134 is swung laterally relative to the pole 123, a pull is exerted through one or the other of the cables just described to cause the rear sprockets 283 and 285 (Figure 7) to turn the rear wheel spindles 228 in one direction or the other. The relation between the two rear wheel units may be adjusted as desired by changing the turnbuckles 281 and 283 together with the corresponding turnbuckle on the left hand side of the leveler. Similarly, adjusting the turnbuckles serves to adjust the tension in the cables 272 and 287 and the associated chain sections.

The working element of the land leveler comprises the blade unit 104 referred to briefly above. The unit 104 comprises a bowl which is made up of a rear plate 301, two side plates 302 and 303, a transverse stiffener 305, and a downwardly and forwardly angled cutting blade 304 secured in position by any suitable means. The upper portions of the side members 302 and 303 are extended, as indicated at 306 and 307, to form forwardly disposed arms which are apertured to receive pivot pins 308 by which the arms are pivotally connected to brackets 311 welded, respectively, to the inner sides of lower frame pipes 221. The rear portions of the side plates 302 and 303 are held in position laterally relative to the frame by rub plates 313 welded or otherwise fixed in the proper position to the lower frame members 221.

Figure 8:
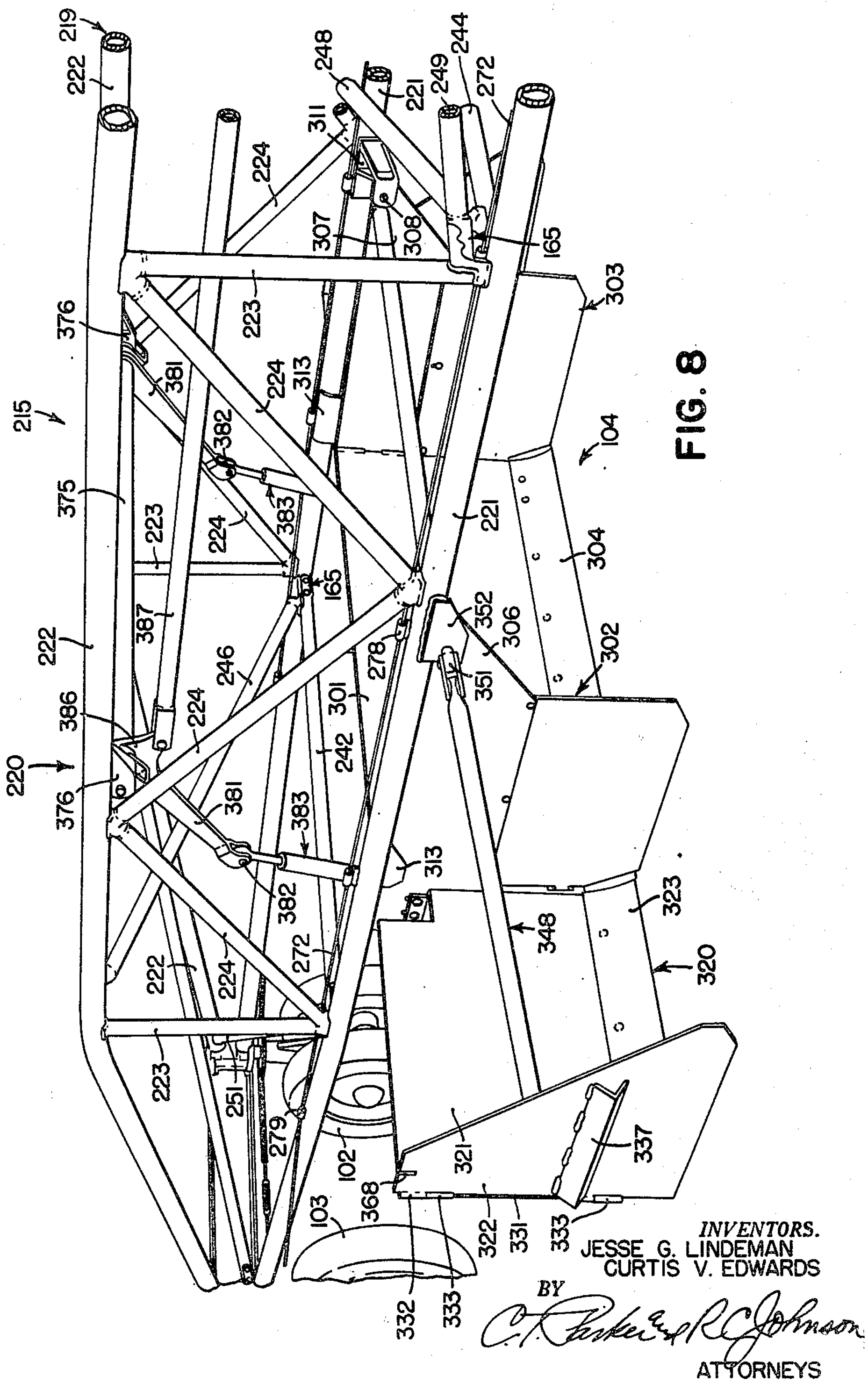
Figure 8 is a perspective view similar to Figure 6 showing the leveling blade in a lowered position and provided with extensions which, in Figure 6, are folded backwardly into inoperative position.
Figure 19:
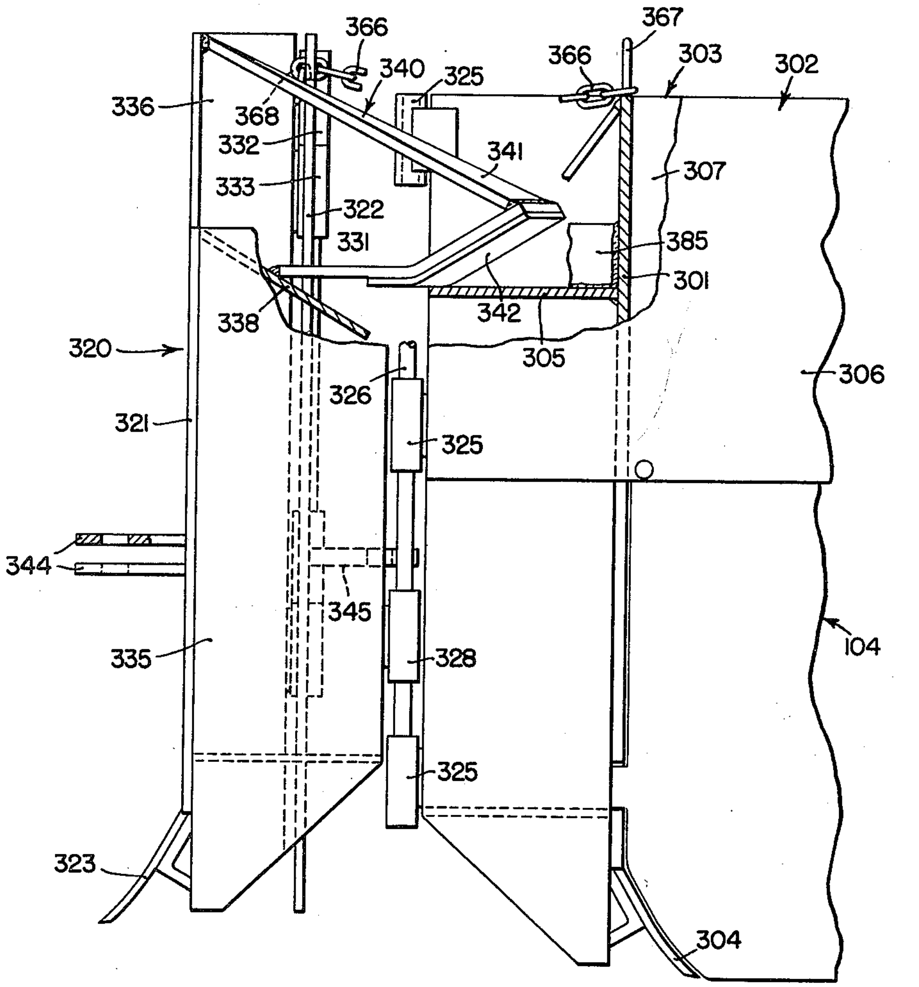
Figure 19 is an enlarged fragmentary side view showing the extension blade support and associated parts in folded position.

As best shown in Figure 8, the bowl or blade unit 104 may be provided with extension blade units, one at each end of the main blade unit, as indicated by the reference numeral 320. Each of the extension units includes a back plate 321, a side plate 322, and a cutting blade 323, which construction may be similar to the corresponding parts of the main blade unit 104. As best shown in Figure 6, the side plates 302 and 303 of the main blade unit are extended rearwardly beyond the back plate 301. The rear portion of each extended section is provided with one or more pairs of sleeves 325 which receive and support a hinge pin 326. The adjacent portion of the associated extension blade unit 320 is provided with similar sleeves 328 which receive the pin 326 whereby each unit 320 is hingedly connected with the adjacent end of the main blade unit 104. The side plate 322 of each extension unit 320 is similarly hinged to the associated back plate 321, as by a hinge pin 331 and associated sleeves 332 and 333 formed on the adjacent edges of the two plates 321 and 322. Preferably, at the inner end the back plate 321 carries a vertical stiffener 335 (Figures 6 and 19) which at its rear edge carries the hinge sleeves 328, and at its outermost end the back plate 321 carries a vertical stiffener 336, Figure 19, which at its forward edge is welded to the outer edge of the back plate 321 and at its rear edge carries the hinge sleeves 332. The end plate 322 is stiffened by an angle 337, as best shown in Figure 8. Along the upper portion of the wing extension 320 the two stiffener sections 335 and 336 are joined by a transversely disposed and downwardly angled plate 338 (Figure 19). Secured to the rearward face of each back plate 321 and the adjacent portion of the transverse wing blade stiffener 338 is a lift cam 340 which comprises an upper member 341 and a lower curved member 342 suitably secured together at their outer ends, as by welding, and suitably connected at their inner ends respectively to the back plate 321 and the stiffener 338. A pair of apertured lugs 344 is fixed to the outer edge portion of the back plate 321 generally midway between the upper and lower edges thereof. The lugs 344 are spaced apart vertically so as to receive therebetween a lug 345 carried on the pivoted outer side plate 322. The lug 345 is also apertured, and when the wing extension 320 is in operating position, as shown in Figure 8, the lug 345 is disposed in between the spaced lugs 344 with their openings in alignment and in a position to receive the hook end 347 (Figure 6) of a diagonal strut member 348 which at its forward end is pivotally connected to a lug 351 carried on a bracket 352 that is welded to the associated lower frame pipe 221 in alignment with the associated pivot 308. Thus, the diagonal strut 348 holds the wing 320 in position.

When it is desired to reduce the width of cut, the two wing extensions 320 are folded back substantially as shown in Figure 6. In order to accomplish this, the hook end 347 of each diagonal strut 348 is disengaged from the lugs 344 and 345 and swung upwardly to an idle position where the hook 347 may be engaged in a loop 353 fixed to an adjacent frame diagonal 224. Each of the wing extensions or blade extensions 320 is adapted to be raised upwardly relative to the main blade unit 104 when the extension is swung around rearwardly into an inoperative position. To accomplish this, first the outermost side plate 322 of each blade extension is folded rearwardly over against the back of the extension unit, and then each unit is swung rearwardly over against the rear side of the main blade or bowl unit 104. The parts are so arranged that when the blade or wing extension 320 is swung rearwardly and then laterally inwardly into the position shown in Figure 6, the lower curved or angled member 342 of the cam unit 340 on the blade extension rides up onto the rear edge of the transverse bowl stiffener 305, thus serving to lift the entire unit 320 upwardly relative to the main blade unit so that the cutting blade 223 is raised in a position out of contact with the ground and above the level of the main blade 304. When the cam member 340 acts against the main blade unit to raise the wing or extension unit 320, the latter is shifted upwardly along the hinge pin 326, there being sufficient clearance between adjacent sleeves 325 and 328 to accommodate this action. After both wings have been folded rearwardly into the position shown generally in Figure 6, the units may be held in folded position by means of a pair of chains 366 anchored to a clip 367 carried by the main bowl back plate 301 and engageable in slots 368 formed in the adjacent portion of the outer plate 322.

For raising and lowering the blade units 104 and 320, we provide a cross shaft 375 rockingly mounted in a pair of brackets 376 that are fixed to the upper frame members 222. An arm 381 is fixed to each end of the rockshaft 375 and at its lower end is pivotally connected, as by a pin 382, to the upper end of a manually adjustable turnbuckle link unit 383 which at its lower end is connected with a pivot pin or the like carried by a pair of apertured lugs 385 fixed, as by welding, to the back side of the main blade plate 301. An arm 386 (Figure 3), preferably formed integrally with one of the lift arms 381, is carried by the rockshaft 375 and is pivotally connected to the rear end of a longitudinally extending lift pipe 387 which extends longitudinally of the frame forwardly and at its forward end is connected by a swivel 388 (Figure 5) to the rear end of the piston rod of a hydraulically operated power lift cylinder unit 390. As best shown in Figure 6, the lift pipe 387 is swingably supported adjacent its central portion by a link member 393 which is pivoted at its lower end to a lug 394 on the pipe 387 and pivoted at its upper end to one of the cross bars of the frame, such as the cross bar 243. The forwardmost end of the lift pipe 387 is supported in a tubular guide 395 carried by the front caster wheel frame unit 110 perferably being fastened to the vertically arched frame member 113, as best shown in Figure 5. The ram unit 390 may be of any suitable construction and preferably is of the double acting type, being adapted to exert a force in either direction and connected to a suitable controllable power lift unit on the tractor by a pair of hose lines 391 and 392. The forward end of the ram unit 390 is anchored, as by a quick detachable pin 394, to a bracket 395 fixed to the forwardmost portion of the horizontal arched frame member 111 and anchored by an attaching member 396 to the adjacent portion of the central arched frame member 112.

In order to apprise the operator of the position of the leveling blade or blades, which are disposed well to the rear of the relatively elongated frame 100, we provide a position indicator which is indicated in its entirety by the reference numeral 400 (Figure 5). The unit 400 includes a dial 401 fixed to a pair of attaching brackets 402. Each of the frame bars 161 carries a lug 403 (Figure 17) secured thereto, as by welding, and, when the frame is fully assembled, the brackets 402 may be bolted to the lugs 403. The brackets 402 are extended below the frame members 161, as best shown in Figure 12, and carry rollers 404 at their lower ends. A length of chain 405 is trained over a sprocket 406 that is fixed to a shaft 407 rockably carried by the sector 401 and to which an indicator hand 408 is fixed. One end of the chain 405 is connected to a cable 409 which extends downwardly alongside the associated support 402 and passes over the associated roller 404 and extended rearwardly where it is connected with a spring 411 that is anchored at its rear end to the adjacent frame bar 161 or some other part of the frame. The other end of the chain 405 is connected by a cable 412 that extends downwardly alongside the other support 402 and over the associated idler roller 404 whence the cable 412 extends rearwardly and at its rear end is connected by a clamp 413 or the like to the lift pipe 387. In this way, when the hydraulic unit 390 is operated to raise or lower the blade, the corresponding movement of the lift pipe 387 is indicated on the dial 401 by the position of the indicator hand 409. Generally, the parts are arranged so that when the lower cutting edge of the blade or blades is disposed substantially exactly in the plane of the lower ground contacting portions of the supporting wheels, the indicator hand 408 will be in a substantially vertical position, as shown in Figure 12. For easy readability, the dial plate 401 may be provided with openings 415 which serve as indicia with which the indicator hand 408 cooperates.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. A land leveler comprising an elongated frame, supported at its front and rear ends, a transverse leveling blade carried by said frame for generally vertical movement into and out of operating position, an extension blade hingedly connected at its laterally inner end to each end of said leveling blade, a wing hingedly connected to the laterally outer edge of each extension blade and adapted to be swung into a forwardly disposed operating position or into a position in back of the associated extension blade, locking means for holding each wing in operating position relative to the associated extension blade, each of said extension blades and said wings being adapted to be folded into inoperative position in back of or extended substantially in alignment with said leveling blade, and means connectible between said frame and each of said locking means, when the latter hold said wings in forwardly extended position relative to the associated extension blades, for holding both the latter and said wings in operative position.

2. A land leveler comprising an elongated frame supported at its front and rear ends, a transverse leveling blade mounted on said frame for generally vertical movement relative thereto, a pair of extension blades hingedly connected with the end portions, respectively, of said leveling blade, each extension blade being swingable rearwardly relative to said leveling blade into a position rearwardly of the latter, means for holding said extension blades in inoperative position substantially against the rear side of said leveling blade, means acting between said leveling blade and said extension blades for raising the latter, relative to said leveling blade, when the extension blades are swung rearwardly into their inoperative position.

3. A land leveler comprising an elongated frame supported at its front and rear ends, a movably mounted transverse leveling blade connected with said frame for vertical movement relative thereto, a pair of blade extensions each hingedly connected at its laterally inner end to the associated end portion of said leveling blade, an outer end plate hingedly connected to the outer portion of each blade extension, and means for detachably holding said end plates in operative position.

4. The invention set forth in claim 3, further characterized by said detachable plate holding means comprising lugs fixed to said extension blade and said end plate and having apertures adapted to be brought into registry when said end plate is in operating position, and a brace member having an end insertable in said registering openings and connected with the leveler frame of the forward point for holding said blade extension in operating position.

5. A land leveler comprising an elongated frame, a movably mounted transverse leveling blade connected with said frame for vertical movement relative thereto, a pair of blade extensions, means for hingedly connecting each blade extension at its laterally inner end to the associated end portion of said leveling blade for movement relative thereto about a generally vertical axis spaced rearwardly of said blade, an outer end plate hingedly connected to the outer portion of each blade extension, said latter hinged connection being disposed rearwardly of the general plane of the blade extension, whereby each outer end plate may be swung into a position in back of the associated blade extension, and said first hinged connecting means being so constructed and arranged that said vertical axes thereof are spaced rearwardly of said transverse leveling blade a distance sufficient to accommodate the movement of each blade extension, together with its associated outer end plate in folded position thereagainst, into a position in back of said leveling blade.

6. A land leveler comprising an elongated frame, a movably mounted transverse leveling blade connected with said frame for vertical movement relative thereto, side members fixed to the ends of said leveling blade and each having a portion disposed rearwardly of said blade, a pair of blade extensions, each having at its laterally inner end a generally vertically disposed part fixed to and extending rearwardly from the inner end of the associated blade extension, hinge means connecting the rear edge portion of each of said vertically disposed blade extension parts and the rear edge portion of the associated leveling blade side member, each blade extension also having at its laterally outer end a second vertically disposed part fixed to and extending rearwardly from the laterally outer end of the associated blade extension, an end plate hingedly connected to the rear edge of each of said outer vertical parts, disconnectible means acting between each blade extension and the associated end plate forwardly of the hinge axis thereof for holding said end plates in forwardly extending position, and means for holding each of said extension blades in extended position.

7. A land leveler as set forth in claim 6, further characterized by said last mentioned means comprising apertured lug means on the forward side of each blade extension at the laterally outer end thereof, cooperating apertured lug means on the inner face of the associated end plate, one of said lug means including a pair of spaced apart lugs and the other lug means including a single lug disposable between said pair of lugs, a pin member disposable through the apertures of said lugs for holding the associated end plate in a forward position relative to the associated blade extension, and brace means acting between each pin member and said frame for holding the blade extensions in extended position.

8. A land leveler comprising an elongated frame, a movably mounted transverse leveling blade, end members secured to the ends of said blade and extending both forwardly and rearwardly thereof, pivot members connecting the forward ends of said end members with said frame, whereby said blade is connected with said frame for vertical movement relative thereto, a pair of blade extensions, rearwardly extending parts at the laterally inner ends of said extensions hingedly connected with the rear ends of said leveling blade end members, an end plate hingedly connected with the laterally outer end of each blade extension and swingable relative thereto between a forwardly extending position and a position in back of the associated blade extension, the latter and the end plate being swingable into a position behind said leveling blade, and means acting between each end plate, the associated blade extension and said frame for holding said end plates and said blade extensions in extended position.

9. A land leveler comprising an elongated frame including a pair of generally laterally spaced apart, generally fore-and-aft extending frame sections, a movably mounted transverse leveling blade, means including laterally inwardly extending pivot members fixed to the laterally inner sides of said frame sections, respectively, and swingably connecting said leveling blade with said frame for vertical movement relative thereto, a pair of blade extensions each hingedly connected at its laterally inner end to the associated end portion of said leveling blade, a pair of laterally outwardly extending pivot members fixed to said frame sections, respectively, substantially in alignment with said laterally inwardly extending pivot members, and a brace member connected at its outer end to the outer end of the associated blade extension and at its inner end to the associated laterally outwardly extending pivot member for holding said blade extensions in extended position.

10. A land leveler comprising an elongated frame, a movably mounted transverse leveling blade, a pair of blade extensions, means connecting the laterally inner ends of said blade extensions with the ends of said leveling blade for both hinging movement about vertical axes and for generally vertical movement along said axes, said blade extensions being swingable about said axes between a laterally outwardly extended position and a folded position in back of said leveling blade, and cooperating cam members carried at the rear side of said blade and on the rear sides of said blade extensions for raising the latter when they are swung into their folded position.

JESSE G. LINDEMAN.
CURTIS V. EDWARDS.

References Cited in the file of this patent

UNITED STATES PATENTS

| Number | Name | Date |
|---|---|---|
| 1,313,954 | Sandstrom | Aug. 26, 1919 |
| 1,582,384 | Corbitt | Apr. 27, 1926 |
| 1,659,819 | Heymann | Feb. 21, 1928 |
| 1,918,881 | Wilson | July 18, 1933 |
| 1,938,120 | Spohn | Dec. 5, 1933 |
| 2,033,117 | Arndt | Mar. 10, 1936 |
| 2,055,767 | Jarmin | Sept. 29, 1936 |
| 2,090,117 | Gledhill | Aug. 17, 1937 |
| 2,124,625 | Marvin | July 26, 1938 |
| 2,176,503 | Leppert | Oct. 17, 1939 |
| 2,237,586 | Cost et al. | Apr. 8, 1941 |
| 2,255,061 | Johnson | Sept. 9, 1941 |
| 2,311,551 | Laird | Feb. 16, 1943 |
| 2,319,670 | Ego | May 18, 1943 |
| 2,329,831 | Ferguson | Sept. 21, 1943 |
| 2,374,016 | Henneuse | Apr. 17, 1945 |
| 2,411,277 | Laird et al. | Nov. 19, 1946 |
| 2,492,573 | Hearron | Dec. 27, 1949 |